United States Patent
Abdoli et al.

(10) Patent No.: US 10,218,763 B2
(45) Date of Patent: Feb. 26, 2019

(54) METHOD AND SYSTEM FOR LOW DATA RATE TRANSMISSION

(71) Applicants: Javad Abdoli, Ottawa (CA); Jianglei Ma, Ottawa (CA); Ming Jia, Ottawa (CA)

(72) Inventors: Javad Abdoli, Ottawa (CA); Jianglei Ma, Ottawa (CA); Ming Jia, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/879,776

(22) Filed: Oct. 9, 2015

(65) Prior Publication Data

US 2016/0330265 A1     Nov. 10, 2016

Related U.S. Application Data

(60) Provisional application No. 62/159,022, filed on May 8, 2015.

(51) Int. Cl.
    *H04L 27/26*            (2006.01)
    *H04L 29/06*            (2006.01)
    (Continued)

(52) U.S. Cl.
    CPC .......... *H04L 65/607* (2013.01); *H04L 5/0021* (2013.01); *H04L 5/0028* (2013.01);
    (Continued)

(58) Field of Classification Search
    CPC ............. H04L 27/2614; H04L 27/2626; H04L 27/2627; H04L 5/06; H04L 65/607; H04J 2011/0009
    (Continued)

(56) References Cited

U.S. PATENT DOCUMENTS

| | | | |
|---|---|---|---|
| 2007/0004465 A1* | 1/2007 | Papasakellariou | H04W 52/282 455/571 |
| 2009/0306975 A1* | 12/2009 | Pietsch | H04J 3/0611 704/214 |

(Continued)

FOREIGN PATENT DOCUMENTS

| WO | 2014075637 | 5/2014 |
|---|---|---|
| WO | 2014090189 | 6/2014 |

OTHER PUBLICATIONS

Wikipedia, "CDMA2000", Available at < https://en.wikipedia.org/w/index.php?title=CDMA2000&oldid=648190204>, Feb. 21, 2015.

(Continued)

*Primary Examiner* — Melvin C Marcelo
*Assistant Examiner* — Natali Pascual Peguero

(57) ABSTRACT

Methods and devices are disclosed for encoding and transmitting data sequences for low data rate applications. An encoded data sequence is transformed and used to shape a multi-carrier pulse to create a narrow-band signal for transmission. Time domain tails of the narrow-band signal may be removed to decrease overhead. The data may be first encoded to create a sparse modulated data sequence. Multi-carrier pulse shaping may be carried out using frequency division multiplexing (FDM) or filter bank multi-carrier (FBMC) techniques. Alternatively, single carrier pulse shaping may be used to create the narrow-band signal.

24 Claims, 15 Drawing Sheets

(51) Int. Cl.
  *H04L 5/06* (2006.01)
  *H04L 5/00* (2006.01)
  *H04L 27/00* (2006.01)
  *H04L 27/34* (2006.01)
  *H04J 11/00* (2006.01)

(52) U.S. Cl.
  CPC ........ *H04L 5/0064* (2013.01); *H04L 27/0008* (2013.01); *H04L 27/264* (2013.01); *H04L 27/2614* (2013.01); *H04L 27/2626* (2013.01); *H04L 27/2627* (2013.01); *H04L 27/2634* (2013.01); *H04L 27/3411* (2013.01); *H04J 2011/0009* (2013.01)

(58) Field of Classification Search
  USPC ........................................ 370/329, 479, 480
  See application file for complete search history.

(56) References Cited

U.S. PATENT DOCUMENTS

| | | | |
|---|---|---|---|
| 2012/0094605 A1* | 4/2012 | Menkhoff | H04B 1/525 455/63.1 |
| 2013/0163542 A1* | 6/2013 | Fettweis | H04W 72/044 370/329 |
| 2014/0140360 A1* | 5/2014 | Nikopour | H04J 13/00 370/479 |
| 2014/0169408 A1* | 6/2014 | Bayesteh | H04B 7/0473 375/144 |
| 2014/0293987 A1 | 10/2014 | Zhu et al. | |
| 2015/0280945 A1* | 10/2015 | Tan | H04L 27/2615 375/267 |
| 2016/0211999 A1* | 7/2016 | Wild | H04L 27/264 |

OTHER PUBLICATIONS

Nikopour, Hosein et al.; 2013 IEEE 24th Annual International Symposium on Personal, Indoor, and Mobile Radio Communications, Dated Sep. 11, 2013.

Shunqing Zhang et al.,"A Survey on 5G New Waveform: From Energy Efficiency Aspects",2014 48th Asilomar Conference on Signals,Systems and Computers,IEEE,Nov. 2, 2014,total 6 pages.

XP055332584 Huawei, "5G: New Air Interface and Radio Access Virtualization", Huawei White Paper Apr. 2015, total 6 pages.

* cited by examiner

METHOD AND SYSTEM FOR LOW DATA RATE TRANSMISSION

CROSS REFERENCE TO RELATED APPLICATIONS

This application claims the benefit of priority from U.S. Provisional Patent Application No. 62/159,022 entitled "Method and System for Low Data Rate Transmission" filed May 8, 2015, the contents of which are incorporated herein by reference.

TECHNICAL FIELD

The present application relates to wireless communications, and specifically, methods and systems for encoding and transmitting data.

BACKGROUND

Alternative transmission techniques have been considered for low data rate transmissions, in particular to support wireless communications for machine type devices. Different data encoding techniques also have been proposed as improvements over code division multiple access (CDMA), such as sparse code multiple access (SCMA), wherein binary data streams are encoded directly to multi-dimensional codewords to spread data over multiple subcarriers or resource elements.

SUMMARY

According to one embodiment of the present disclosure, there is provided a method for transmitting data. The method includes encoding binary data to a sparse modulated data sequence; transforming the sparse modulated data sequence; shaping a multicarrier pulse using the transformed symbol to create a narrow-band signal; and transmitting the narrow-band signal.

According to one embodiment of the present disclosure, there is provided a transmitter. The transmitter includes an encoder configured to encode binary data to a sparse modulated data sequence; a symbol transformation module configured to transform the sparse modulated data sequence; and a pulse shaping module configured to shape a multicarrier pulse using the transformed symbol to create a narrow-band signal and transmit the narrow-band signal.

According to one embodiment of the present disclosure, there is provided a method for transmitting data. The method includes encoding binary data to a sparse modulated data sequence; performing pulse shaping on the sparse modulated data sequence to create a narrow-band signal; and transmitting the narrow-band signal.

According to one embodiment of the present disclosure, there is provided a method for transmitting data. The method includes encoding binary data to an encoded low peak-to-average power ratio (PAPR) data sequence; performing pulse shaping on the encoded low PAPR data sequence to create a narrow-band signal; removing a time domain tail of the narrow-band signal to create a modified narrow-band signal; and transmitting the modified narrow-band signal.

According to one embodiment of the present disclosure, there is provided a transmitter. The transmitter includes an encoder configured to encode binary data to a sparse modulated data sequence; and a pulse shaping module configured to perform pulse shaping on the sparse modulated data sequence to create a narrow-band signal and to transmit the narrow-band signal.

According to one embodiment of the present disclosure, there is provided a transmitter. The transmitter includes an encoder configured to encode binary data to a low peak-to-average power (PAPR) data sequence; and a pulse shaping module. The pulse shaping module is configured to perform pulse shaping on the encoded low PAPR data sequence to create a narrow-band signal, remove a time domain tail of the narrow-band signal to create a modified narrow-band signal, and transmit the narrow-band signal.

In another embodiment, the method performing single carrier or multi-carrier pulse shaping. In some embodiments, a sparse code multiple access (SCMA) encoding is used and particularly, a low peak-to-average power ratio (PAPR) set of codewords. In some embodiments, narrow-band transmissions may employ frequency division multiplexing (FDM). In another embodiment, narrow-band transmissions may employ filterbank multi-carrier (FBMC) transmissions.

BRIEF DESCRIPTION OF THE DRAWINGS

Reference will now be made, by way of example, to the accompanying figures which show example embodiments of the present application, and in which.

Like reference numerals are used throughout the Figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

Figure 1:
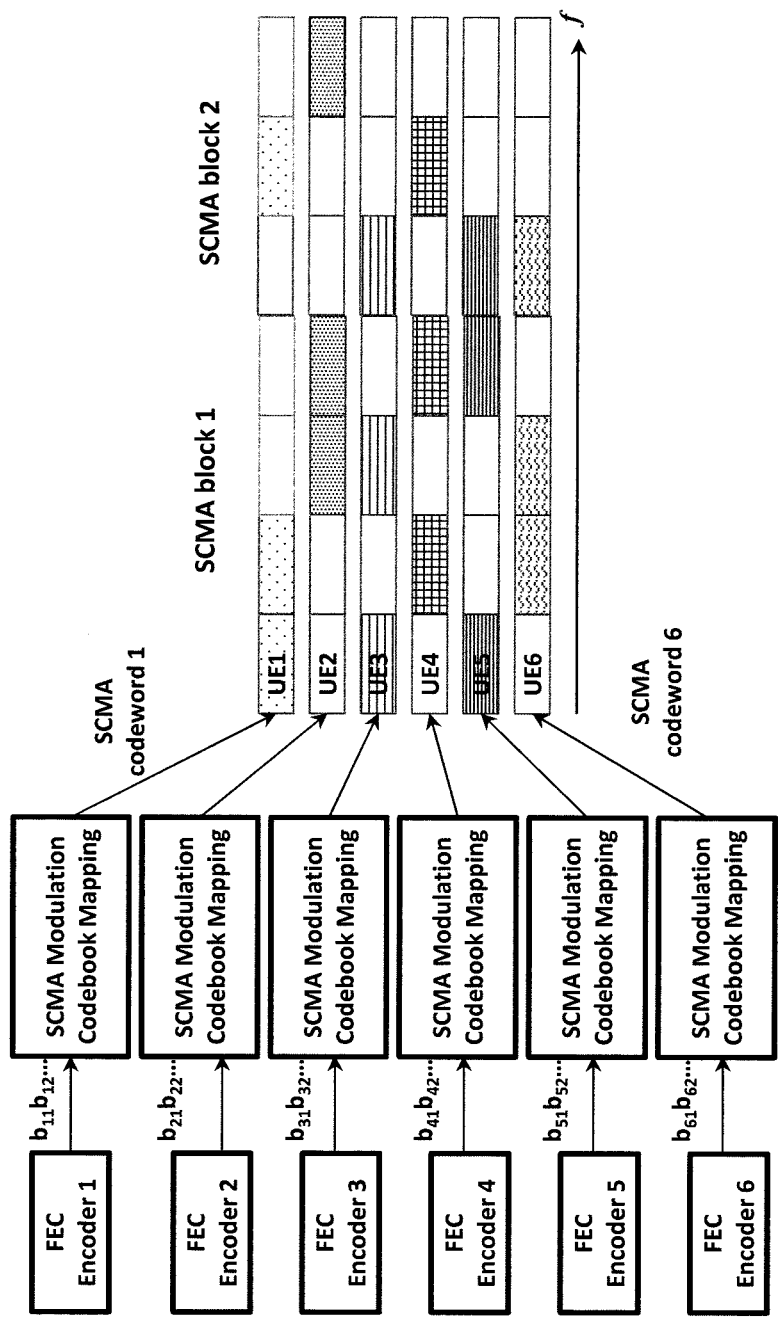
FIG. 1 is a block diagram illustrating data encoding for a communications system.

The present disclosure teaches methods, devices and systems for implementing a waveform transmission scheme applicable to low data rate applications in a wireless network. For applications where a low data transmission rate is required, beneficial, acceptable, or is otherwise desired, data transmission may be performed using narrow-band transmission. In some embodiments, the narrow-band transmission scheme is combined with a scheme for encoding data. In some embodiments, the narrow-band transmission scheme is combined with techniques to reduce overhead in the data transmission. Such low data rate applications may include user devices in a coverage area remote from a base station, eNodeB or other network node and having a low signal to noise ratio (SNR), such that data transmissions are power limited. Other applications may include machine type communication (MTC), such as may occur as part of the "Internet of things", where a low data rate may be acceptable or mandated by the use of less complex or costly data transmitters and receivers. Where a communication from a machine to a network includes a status update, sensor reading, alarm or the like, data packets may be small, and a high data rate is less likely to be required. In one embodiment, a machine includes an apparatus or device with means to transmit and/or receive data through a communications network but such apparatus or device is not typically operated by a user for the primary purpose of communications. It will be appreciated that the systems and methods described herein may also be applied to other low data rate transmission applications.

Narrow-band transmissions provide waveform flexibility using pulse shape design with flexible bandwidth. This provides a well-localized spectrum using appropriate pulse shapes which are less sensitive, for example, to carrier frequency offset (CFO) and phase noise. Narrow-band transmissions may employ frequency division multiplexing (FDM), which provides full orthogonality and no inter-symbol interference (ISI) or inter-carrier interference (ICI). In another embodiment, narrow-band transmissions may employ filterbank multi-carrier (FBMC) transmissions, which provide a compromise with real orthogonality and imaginary ISI/ICI. A narrow-band signal in some embodiments is a signal having a bandwidth less than 1.25 MHz. Alternatively, a narrow band signal may have a bandwidth less than the bandwidth for a resource block, such as the bandwidth for an LTE resource block (180 kHz). In other embodiments, the bandwidth may be less than one half the bandwidth of an LTE resource block (90 kHz), or less than the bandwidth of an LTE resource element, (15 kHz).

As described herein, by combining narrow-band waveform transmission with an encoded and sparse modulated data sequence, such as, but not limited to, a sparse code multiple access (SCMA) data encoding method, the peak-to-average power ratio (PAPR) for a transmitted signal from a user device may be reduced and overloading of resources in a communications system may be achieved. For applications such as, but not limited to, machine type communications, a lower PAPR improves the efficiency of signal amplification and reduces power dynamic range of the transmitter in the machine. SCMA enables data for each layer of a transmission to be spread over multiple resource elements for transmission, such as multiple orthogonal frequency-division multiplexing (OFDM) subcarriers. Binary data streams are encoded directly to multi-dimensional codewords instead of mapping the data stream to a quadrature amplitude modulation (QAM) symbol and applying a spreading sequence. The sparsity of the codewords enables the use of techniques such as message passing algorithm (MPA) and reduces receiver complexity.

Although SCMA is seen as an improvement to some aspects of OFDM, the present embodiments are not limited to an OFDM system, and are applicable to any resource element in addition to OFDM subcarriers, such as time, frequency, spatial elements (i.e. antenna dimension) or combinations thereof.

As further described herein, a narrow-band waveform transmission may be combined with techniques to remove overhead in the transmitted signal. Such techniques may include truncation of time domain tails or tail biting using circular convolution. These two mechanisms may be further combined with the use of a sparsely encoded data sequence such as, but not limited to, the SCMA data encoding method.

FIG. 1 illustrates SCMA encoding for six user devices or user equipment (UE1-UE6) in a communications system. Codebooks may be assigned to the same user device or to different user devices. During data transmissions, such as uplink transmissions from a user device to a network node or network reception point, a codebook may be assigned to each user device, such as during the scheduling of data transmissions. For downlink transmissions, different codebooks may be used for each multiplexed layer of data.

Figure 2:
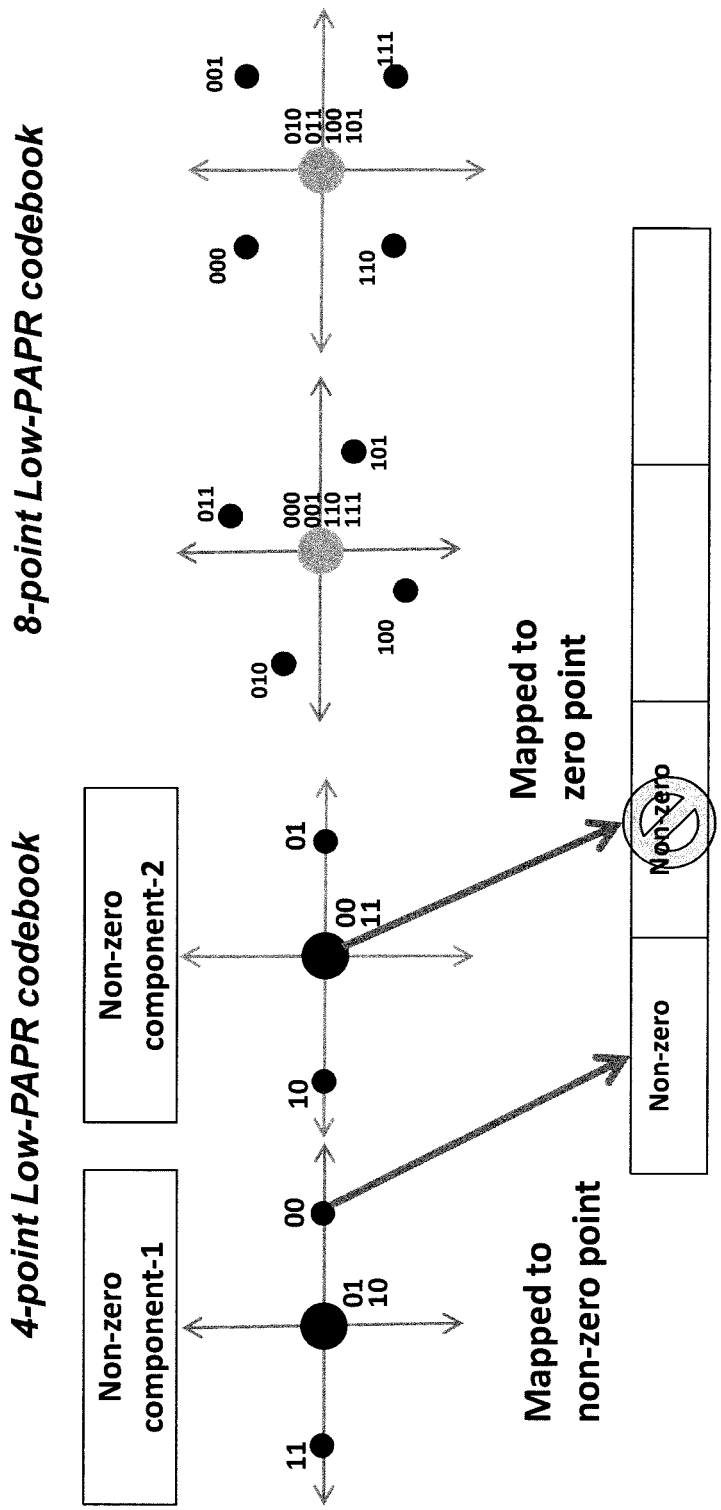
FIG. 2 is a diagram illustrating data encoding examples.

Binary data is provided to an encoder, such as a forward error correction (FEC) encoder, and then directly mapped to the SCMA codeword based on the codebook associated with the user device or transmission layer to create the modulated data sequence. In example embodiments, a 4-point or 8-point low PAPR codebook may be used as illustrated in FIG. 2. Using a 4-point codebook, for the transmission by UE1 in FIG. 1 and binary data or bits [0,0], it will be seen from FIG. 2 that only one active, non-zero component occurs for each SCMA codeword, and bits [0,0] are mapped to a non-zero constellation point only in one non-zero resource element. Similar encoding may be used for the second user device or UE2 in FIG. 1, wherein only the third and fourth resource elements of the first SCMA block are used. Of those two resource elements, again only one of the two is active or non-zero based on the low PAPR code book. As a result, in the examples shown in FIGS. 1 and 2, a single resource element or "single carrier-like" multicarrier access scheme may be provided because there is only one active non-zero component for each SCMA codeword. Although the UE data transmissions are non-orthogonal, this scheme with the 4-point low PAPR codebook permits overloading with, for example, six user devices transmitting data over four resource elements due to the sparsity of SCMA codewords. With the use of an 8-point codebook, the PAPR does not increase with increased constellation size because all constellation points have the same amplitude.

In one embodiment, new methods and systems are proposed wherein SCMA encoding is combined with narrow-band transmissions to achieve multi-carrier transmissions which may be particularly suitable for low data rate transmissions.

Figure 3:
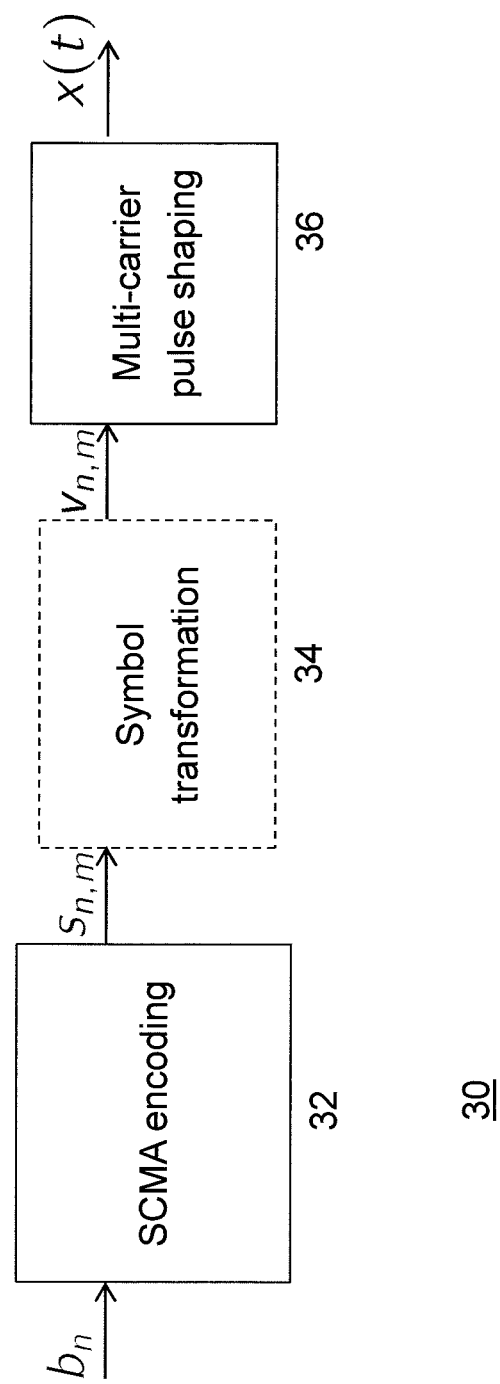
FIG. 3 is a block diagram illustrating a transmitter in accordance with one implementation of the present disclosure.

A block diagram of a multi-carrier SCMA transmitter 30 according to one embodiment of the present disclosure is illustrated in FIG. 3. The transmitter 30 may be part of a device used for communications between different devices. In other embodiments, the transmitter 30 may be part of a device or machine configured to send and/or receive data to a wireless network. In one embodiment, the transmitter receives data for transmission in the form of FEC encoded bits $b_n$. The SCMA encoding module 32 maps the binary data of the FEC encoded bit stream directly to an SCMA codeword and subcarriers as described above to create a sparse modulated data sequence $S_{n,m}$.

In one embodiment, the encoded symbols $S_{n,m}$ may be transformed, as represented by symbol transformation module 34, through a known function, such as but not limited to QAM, π/4 QAM or offset QAM (OQAM) as set out below. Such transformations may be done to further reduce PAPR.

$$QAM: V_{n,m} = S_{n,m}$$

$$\pi/4\text{-}QAM: V_{n,m} = e^{j\theta_n} S_{n,m} \text{ where } \theta_n = \mod(n, 2) \times \frac{\pi}{4}$$

$$OQAM: V_{n,m} = e^{j(n+m)\frac{\pi}{2}} S_{n,m}$$

Multi-carrier pulse shaping is applied to the sparse modulated data sequence $S_{n,m}$ or to the transformed symbol $V_{n,m}$, as represented at multi-carrier pulse shaping module 36, to achieve the narrow-band signal x(t). Multi-carrier pulse shaping may be carried out using frequency division multiplexing (FDM) wherein pulse shapes are separate in frequency and have full orthogonality. Alternatively, multi-carrier pulse shaping may be carried out using filter bank multi-carrier (FBMC), wherein pulse shapes overlap in frequency and achieve orthogonality only in the real domain. The signal x(t) may be determined as set out below. It will be appreciated that further known actions may be taken to process and amplify the signal x(t) for transmission in a communications network.

For $QAM, \pi/4\text{-}QAM$:

$$x(t) = \sum_{n,m} v_{n,m} e^{j2\pi m \Delta F t} p(t - nT)$$

For OQAM:

$$x(t) = \sum_{n,m} v_{n,m} e^{j2\pi m \Delta F t} p(t - nT/2)$$

Figure 4:
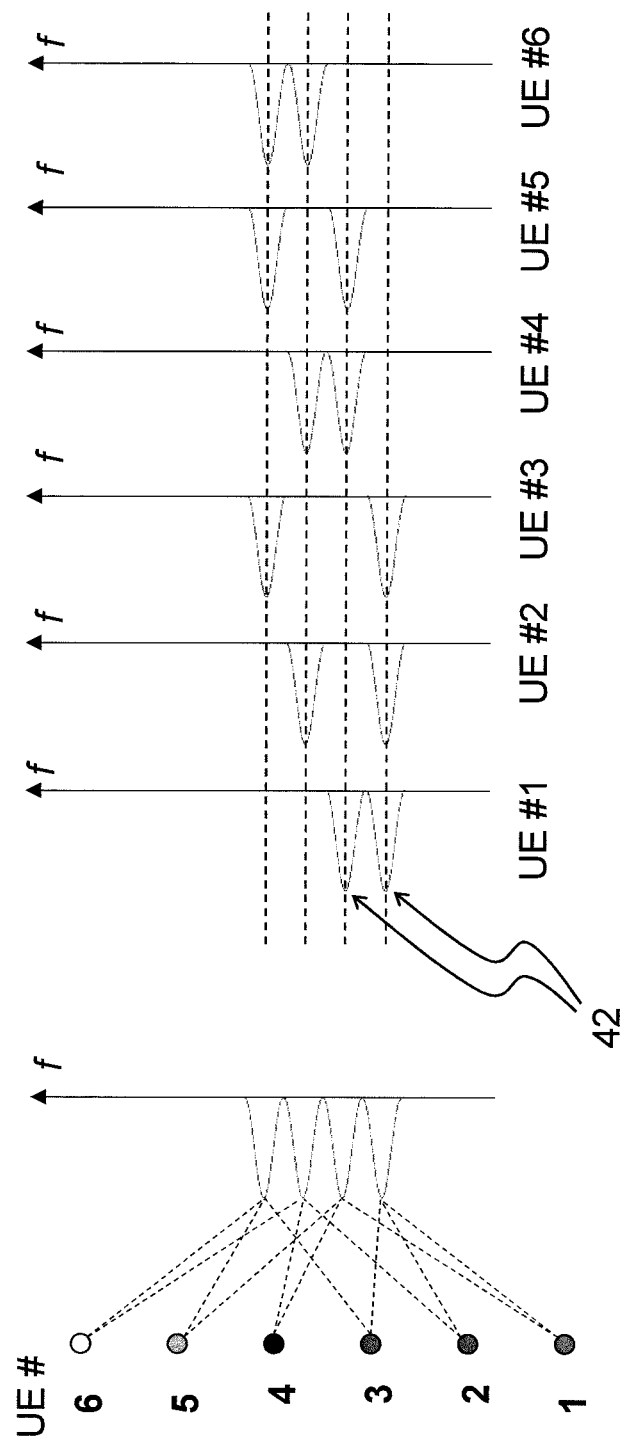
FIG. 4 is a diagram illustrating representative signals from multiple user devices in a communication system in accordance with one example implementation of the present disclosure.

FIGS. 4 and 5 illustrate example embodiments of the use of narrow-band transmission with multi-carrier SCMA encoding by multiple user devices or UEs in a communication system. As described above, along with the receipt of scheduling information, each user device may receive an indication of which SCMA codebook to use for encoding a transmission. The scheduling and SCMA codebook information may be received from a network node such as a base station or eNodeB or other reception point or scheduling entity in the communications system. In other embodiments, the transmissions may be less fully scheduled. A user device may receive scheduling information only regarding physical resources or parameters which should be used by that user device. In these embodiments, scheduling or assignment of a particular SCMA codebook to the user device is omitted. Random access by user devices and contention based use of codebooks may be permitted in order to reduce signalling overhead.

In the first example in FIG. 4, low-PAPR SCMA codebooks are used, in which at most one resource element is non-zero in each symbol time. In this example, a codeword length (L) of 4 is used along with four resource elements (M) or frequency subcarriers, and FDM pulse shaping. The left side of FIG. 4 illustrates the multicarrier signal and a factor graph for UEs 1-6. As can be seen in FIG. 4, at most one of the two elements (indicated as 42 in FIG. 4) of the codeword spread over the four subcarriers is non-zero, resulting in a single-carrier-like multicarrier transmission. PAPR may be reduced because the transmitter is not silent for any symbol time.

In the example of FIG. 4, communications from up to six user devices (UEs 1-6) to a network node or reception point may be supported. If support for additional user devices is required, additional SCMA blocks or transmissions may be supported on an asynchronous basis. Because the transmitted narrow-band signal has a well localized waveform, asynchronous transmissions from additional user devices will not significantly interfere with other user devices. In this example, transmissions from up to twenty-four user devices over up to four SCMA blocks may be supported. In other example embodiments, additional user devices may be supported.

Figure 5A:
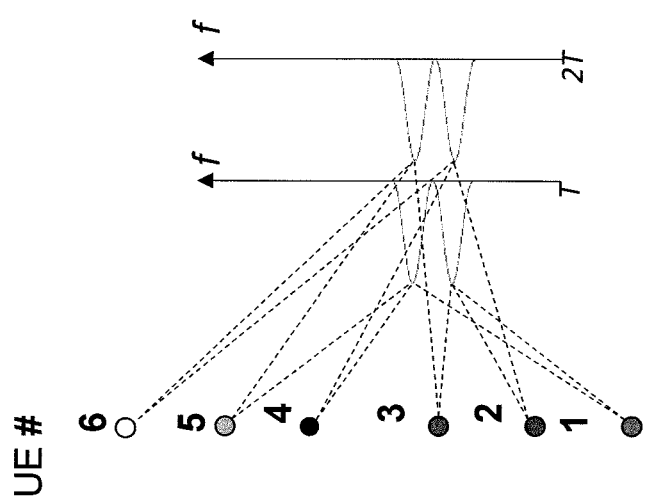
FIGS. 5A and 5B are diagrams illustrating representative signals from multiple user devices in a communication system in accordance with another example implementation of the present disclosure.
Figure 5B:
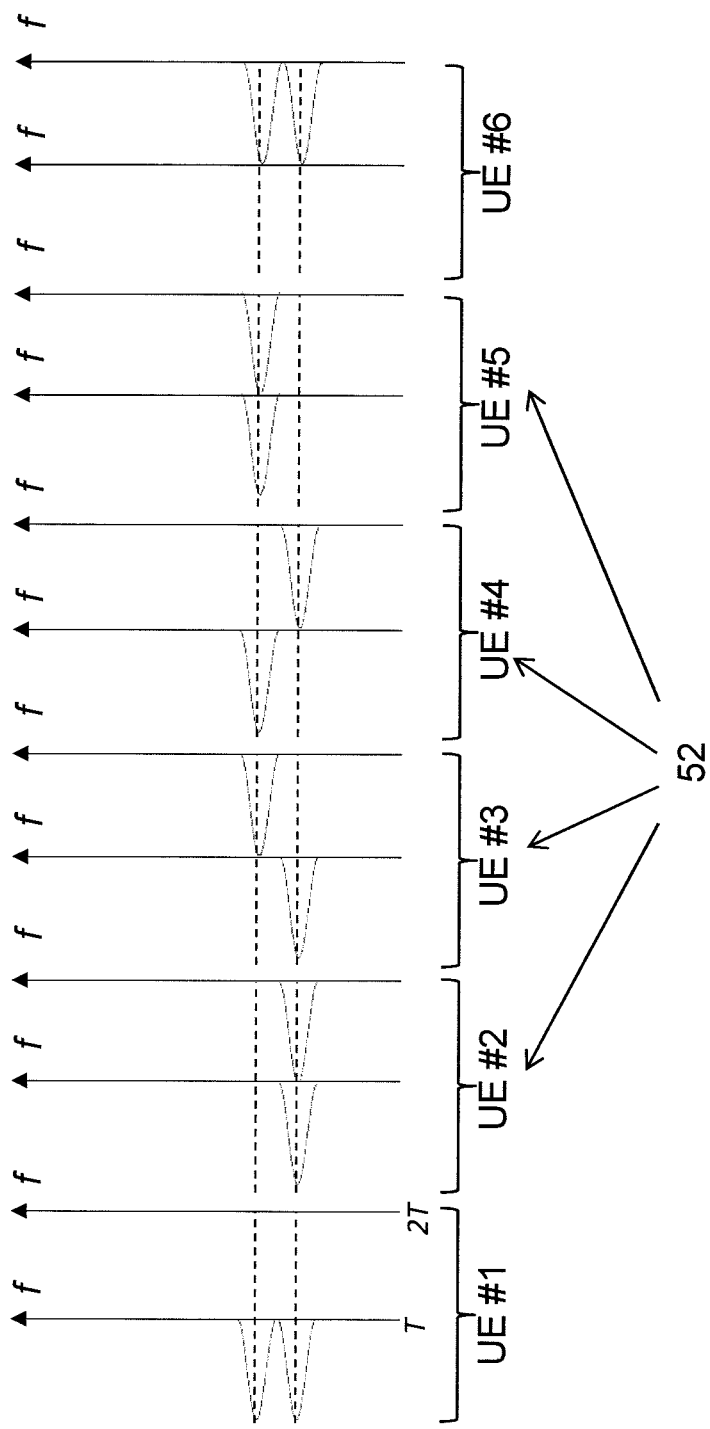

FIGS. 5A and 5B illustrate a similar example of a narrow-band transmission with multi-carrier SCMA encoding using regular or non-low PAPR codebooks, with each codeword having more than one non-zero element. In the example shown in FIGS. 5A and 5B, the number of resource elements (M) or subcarriers is 2, which is less than the codeword length (L) of 4. The resource elements are spread over two time periods (T and 2T) and frequency such that UEs with only one active element in each symbol time, as indicated at 52 in FIG. 5B, will have a low PAPR. FIG. 5A illustrates the multicarrier signal and a factor graph for UEs 1-6. From the examples of FIGS. 4, 5A and 5B, it will be appreciated that in some embodiments, the entire multicarrier waveform is adjustable by adjusting the pulse width.

Figure 6:
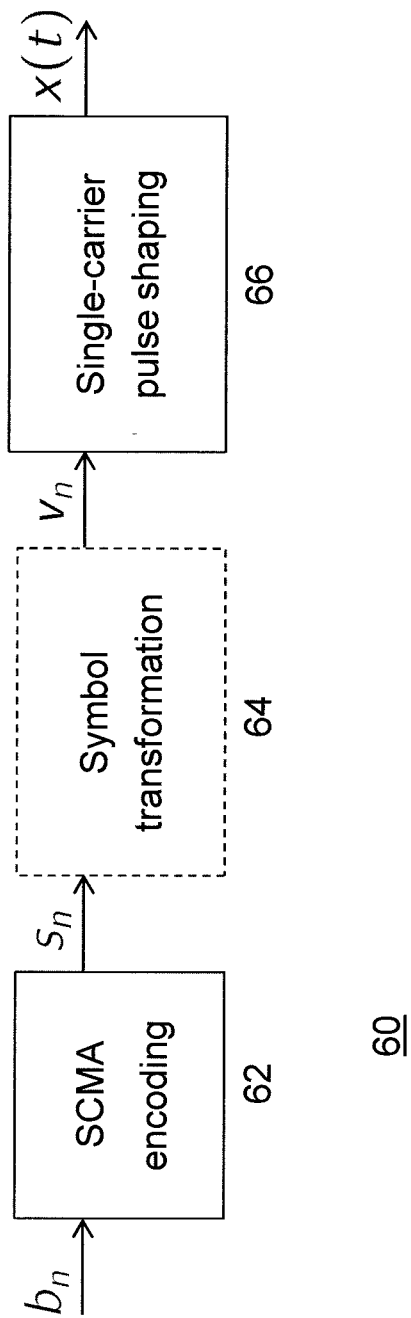
FIG. 6 is a block diagram illustrating a transmitter in accordance with one implementation of the present disclosure.

FIG. 6 illustrates a block diagram of a single-carrier SCMA transmitter 60 according to one embodiment of the present disclosure. The transmitter 60 may be part of a device used for communications between different devices. In other embodiments, the transmitter 60 may be part of a device or machine configured to send and/or receive data to a wireless network. In an embodiment, all data is transmitted over the same narrow bandwidth using the same single-carrier pulse shape, such as a root-raised cosine (RRC). The SCMA codewords for each UE are spread only in time based on the SCMA factor graph.

In one embodiment, the transmitter receives data for transmission in the form of FEC encoded bits $b_n$. The SCMA encoding module 62 maps the binary data of the FEC encoded bit stream directly to an SCMA codeword and subcarrier to create the modulated data sequence $S_n$. In one embodiment, the encoded symbols $S_n$ may be transformed, as represented by symbol transformation module 64 through a known function, such as, but not limited to, QAM, π/4 QAM or offset QAM (OQAM) as set out below.

$$QAM: V_n = S_n$$

$$\pi/4\text{-}QAM: V_n = e^{j\theta_n} S_n \text{ where } \theta_n = \mod(n, 2) \times \frac{\pi}{4}$$

$$OQAM: V_n = e^{jn\frac{\pi}{2}} S_n$$

Single-carrier pulse shaping is applied to the modulated data sequence $S_n$ or to the transformed symbol $V_n$ as represented at single-carrier pulse shaping module 66, to achieve the narrow-band signal x(t). The signal x(t) may be determined as set out below and, as described above, further known actions may be taken to process and amplify the signal x(t) for transmission to a communications network.

For QAM, $\pi/4$-QAM:
$$x(t) = \sum_n v_n p(t - nT)$$

For OQAM:
$$x(t) = \sum_n v_n p(t - nT/2)$$

Figure 7:
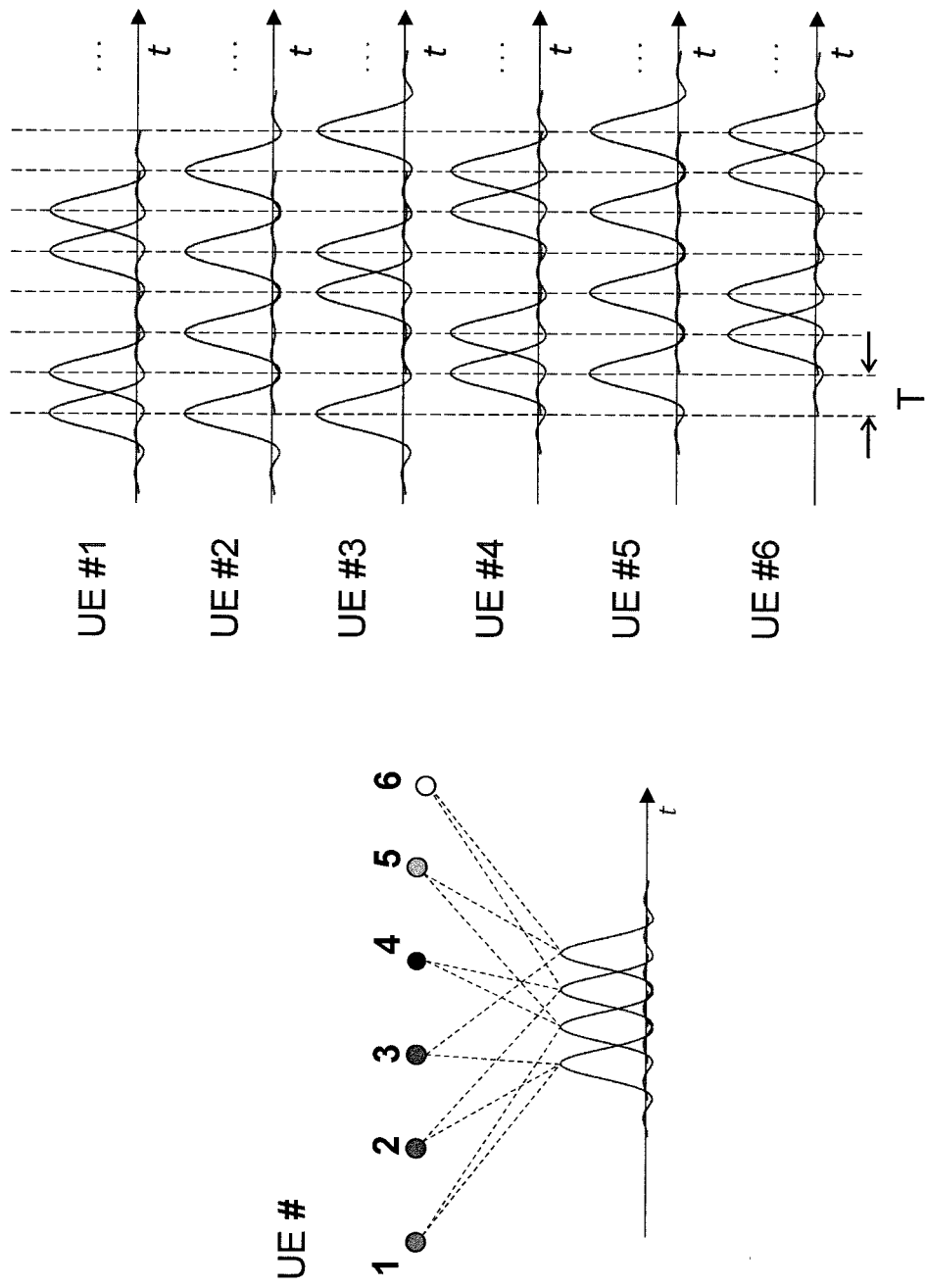
FIG. 7 is a diagram illustrating representative signals from multiple user devices in a communication system in accordance with one example implementation of the present disclosure.
Figure 8:
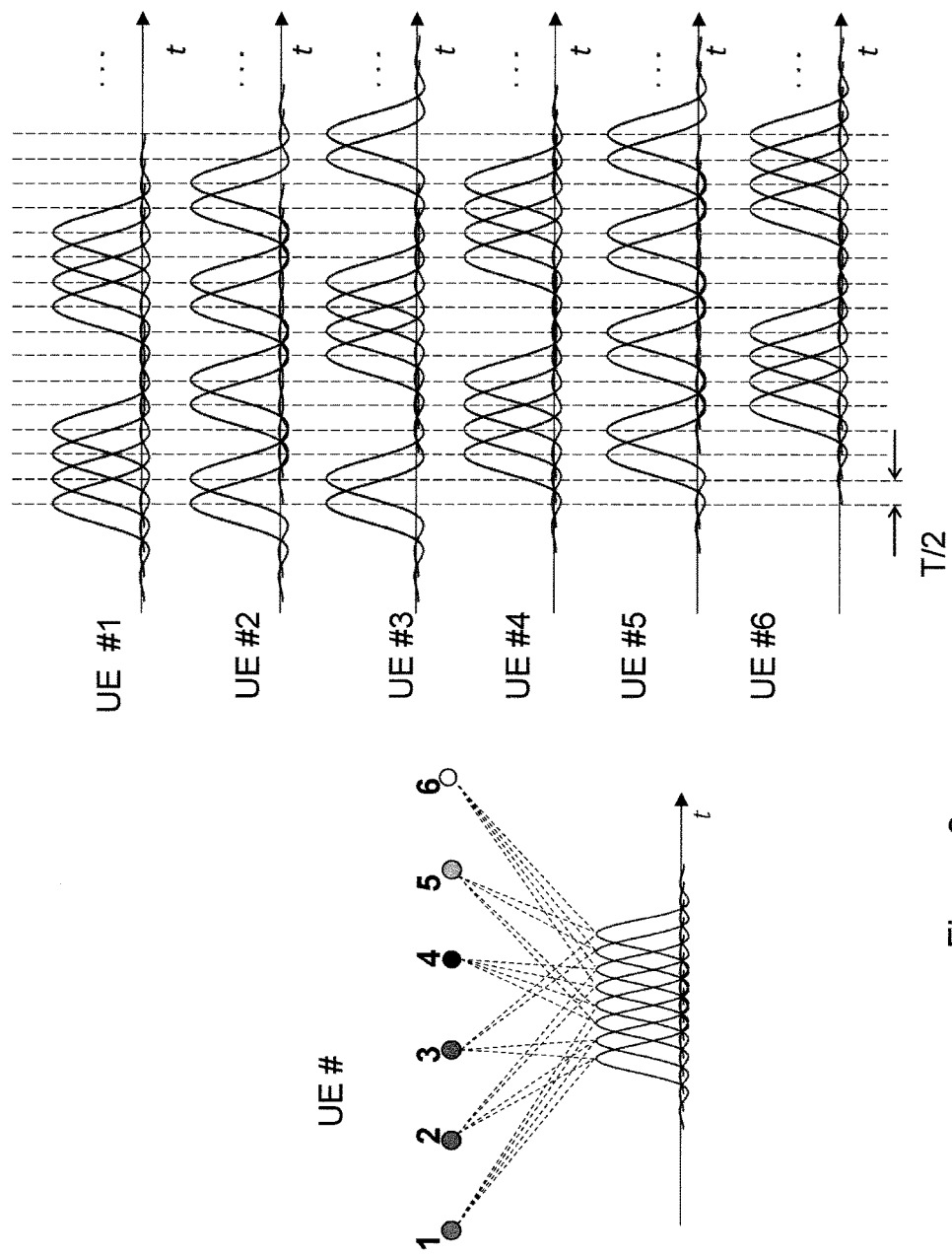
FIG. 8 is a diagram illustrating representative signals from multiple user devices in a communication system in accordance with another example implementation of the present disclosure.

FIGS. 7 and 8 illustrate example embodiments of the use of narrow-band transmission with single-carrier SCMA encoding by multiple user devices or UEs in a communication system. In the first example in FIG. 7, SCMA codebooks are used in which each codeword has more than one non-zero element. In this example, a codeword length (L) of 4 is used with data from 6 UEs and a symbol transformation of QAM or π/4-QAM. The left side of FIG. 7 provides a factor graph of communications from UEs or layers 1-6.

FIG. 8 illustrates a similar example of a narrow-band transmission with single-carrier SCMA encoding using SCMA codebooks in which each codeword has more than one non-zero element. In this example, a codeword length (L) of 4 is used with data from 6 UEs and a symbol transformation of OQAM. The left side of FIG. 8 provides a factor graph of communications from UEs or layers 1-6.

Figure 9:
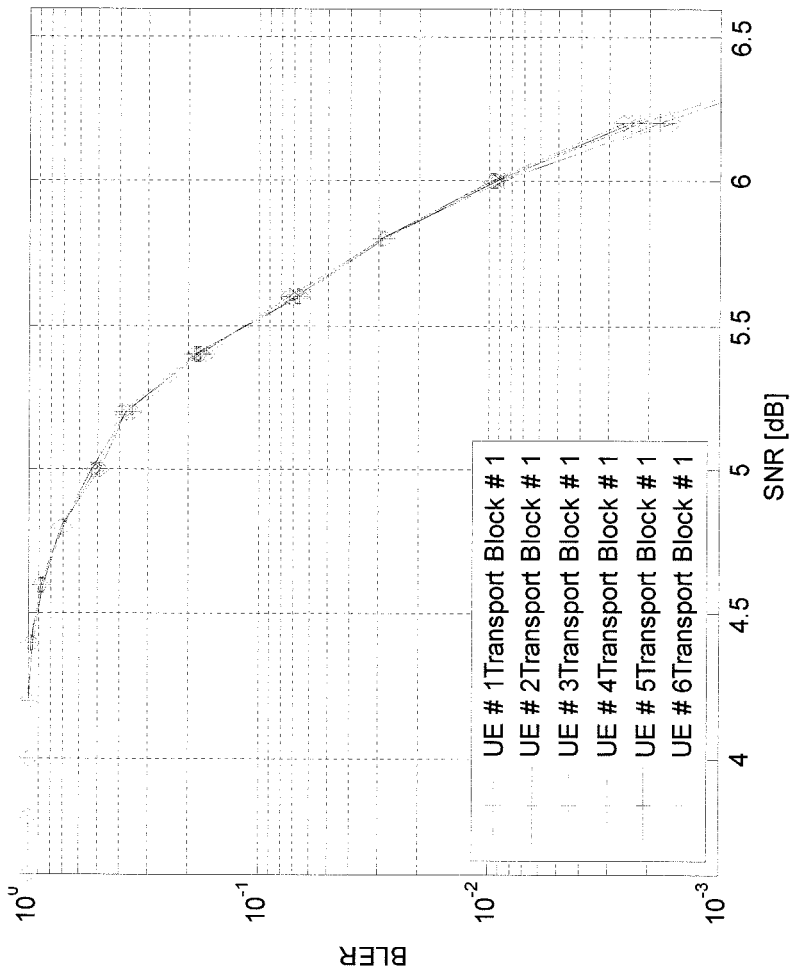
FIG. 9 is a graph illustrating simulation results in accordance with one implementation of the present disclosure.
Figure 10A:
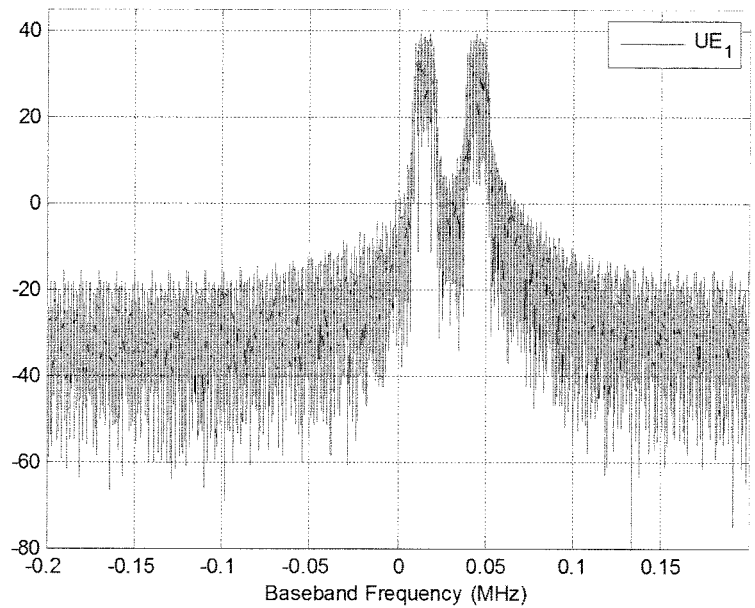
FIGS. 10A and 10B are graphs illustrating simulation results in accordance with one implementation of the present disclosure.
Figure 10B:
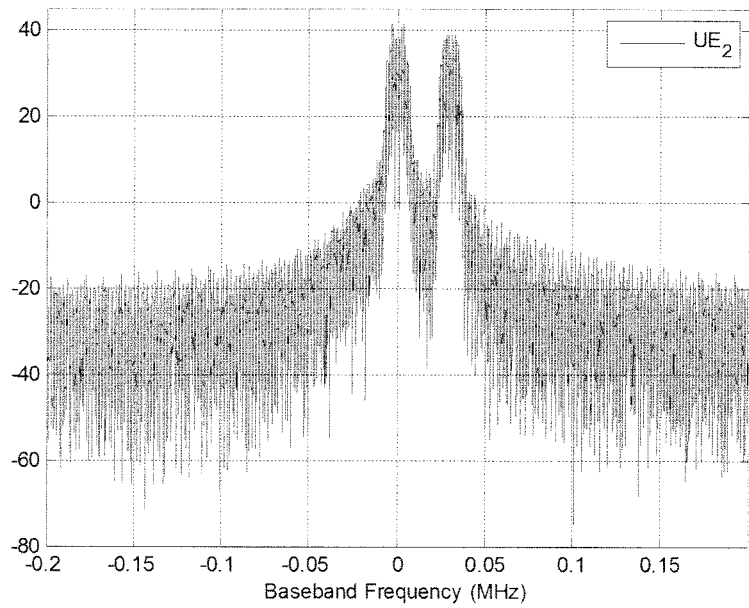
Figure 11:
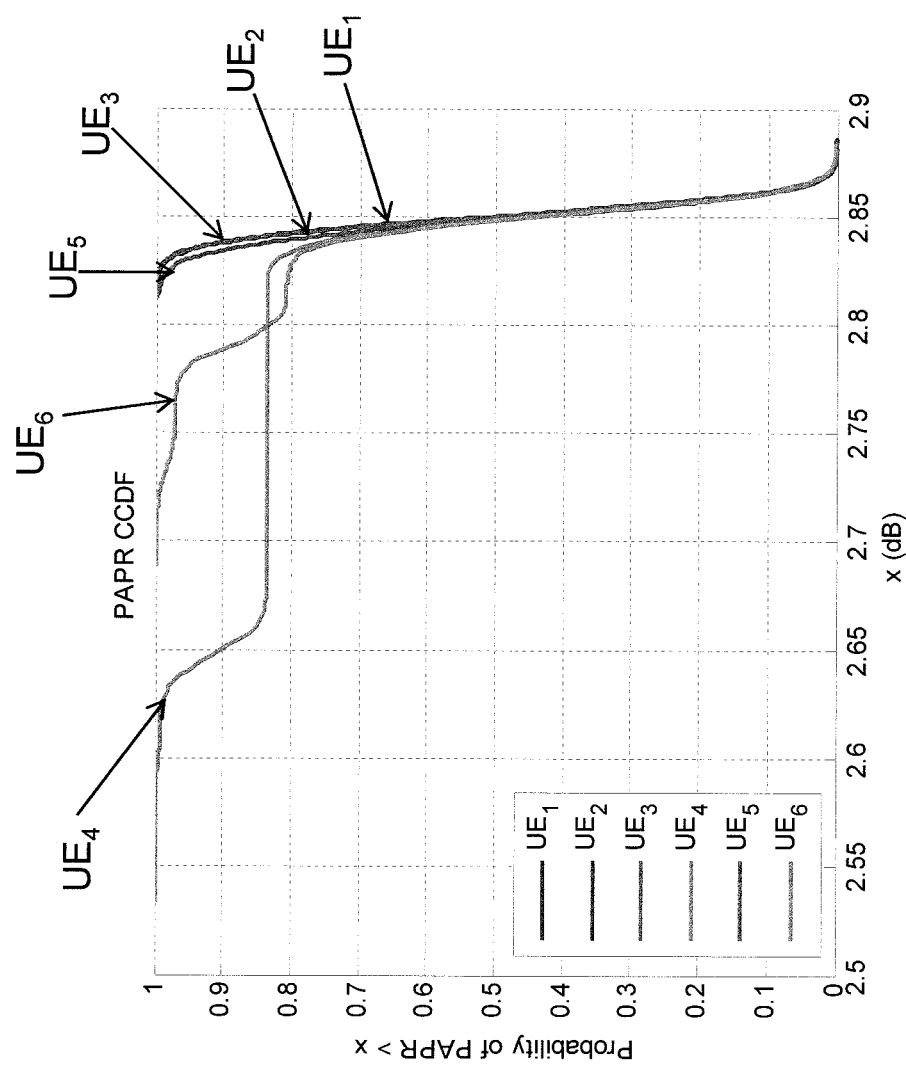
FIG. 11 is a graph illustrating simulation results in accordance with one implementation of the present disclosure.

FIGS. 9-11 illustrate simulation results according to the example embodiment illustrated in FIG. 4 and described above. The simulation was performed for data of six UEs using an RRC pulse shape, a pulse shape roll-off factor (α) of 0.5, a 4-point low PAPR SCMA codebook with SCMA codewords of length 6, a FEC rate of ½, an AWGN channel, and FDM multiplexing over 4 subcarriers with a subcarrier spacing of 15 kHz. FIG. 9 illustrates the simulated block error rate (BLER), with results for each UE being approximately the same. FIGS. 10A and 10B illustrate a power spectral density for the transmissions of each of two UEs, $UE_1$ and $UE_2$. Finally, FIG. 11 illustrates a complementary cumulative distribution of the PAPR.

Figure 12:
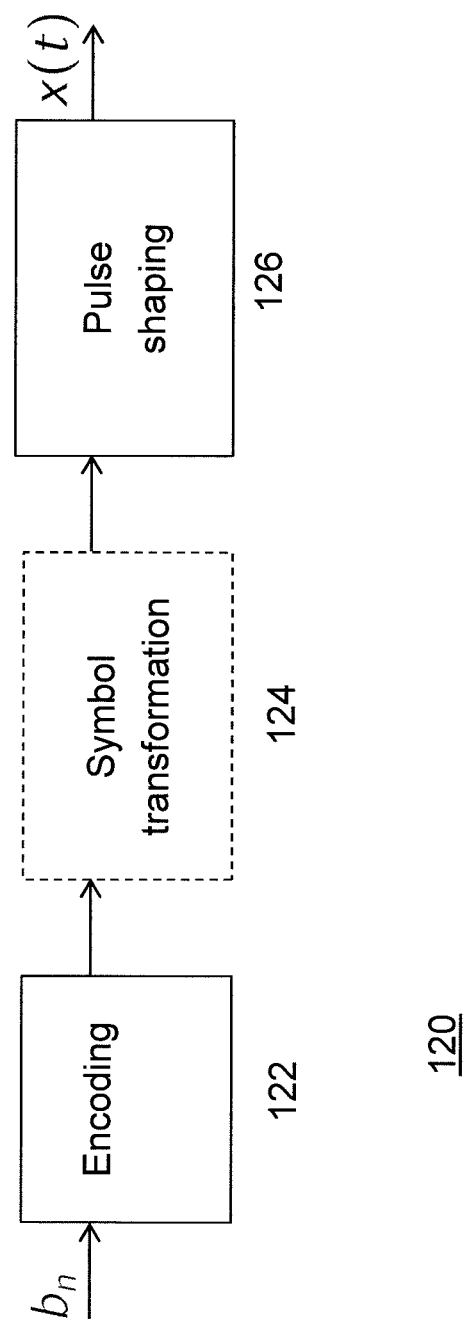
FIG. 12 is a block diagram illustrating a transmitter in accordance with one implementation of the present disclosure.

FIG. 12 illustrates a block diagram of a transmitter 120 according to one embodiment of the present disclosure. The transmitter 120 may be part of a device used for communications with other devices. In other embodiments, the transmitter 120 may be part of a device or machine configured to send and/or receive data to a wireless network. The transmitter 120 may be configured to support single carrier or multi-carrier transmissions. In one embodiment, the transmitter receives data for transmission in the form of FEC encoded bits $b_n$. An encoding module 122 maps the binary data of the FEC encoded bit stream directly to a low PAPR data sequence and a subcarrier or subcarriers as described above to create an encoded low PAPR data sequence $S_n$ or $S_{n,m}$.

In one embodiment, the encoded symbols $S_n$ or $S_{n,m}$ of the low PAPR data sequence may be transformed, as represented by symbol transformation module 124, through a known function, such as but not limited to QAM, π/4 QAM or offset QAM (OQAM), as described above, for multi-carrier and single-carrier implementations. Such transformations may be done to further reduce PAPR.

Pulse shaping is applied to the transformed symbol $V_n$ or $V_{n,m}$, or to the encoded low PAPR data sequence as represented at pulse shaping module 126, to achieve the narrow-band signal x(t). Single-carrier or multi-carrier pulse shaping may be applied, as described above. In one embodiment, multi-carrier pulse shaping may be carried out using FDM or FBMC as described above.

The pulse shaping module 126 is also configured to remove time domain tails of the signal prior to transmission. Although the tails contain some signal information, the relative overhead of these tails may be significant compared to the time or duration of one symbol of the narrow-band signal. This overhead also may be significant for communications with small bursts of data or small packet sizes such as MTC. In one embodiment, the time domain tails of the signal may be removed by truncating the signal to create a modified narrow-band signal. Alternatively, the time domain tails of the transmitted signal may be removed by incorporating a tail biting technique. The modified narrow-band signal, with the time domain tails removed, is then transmitted.

Figure 13:
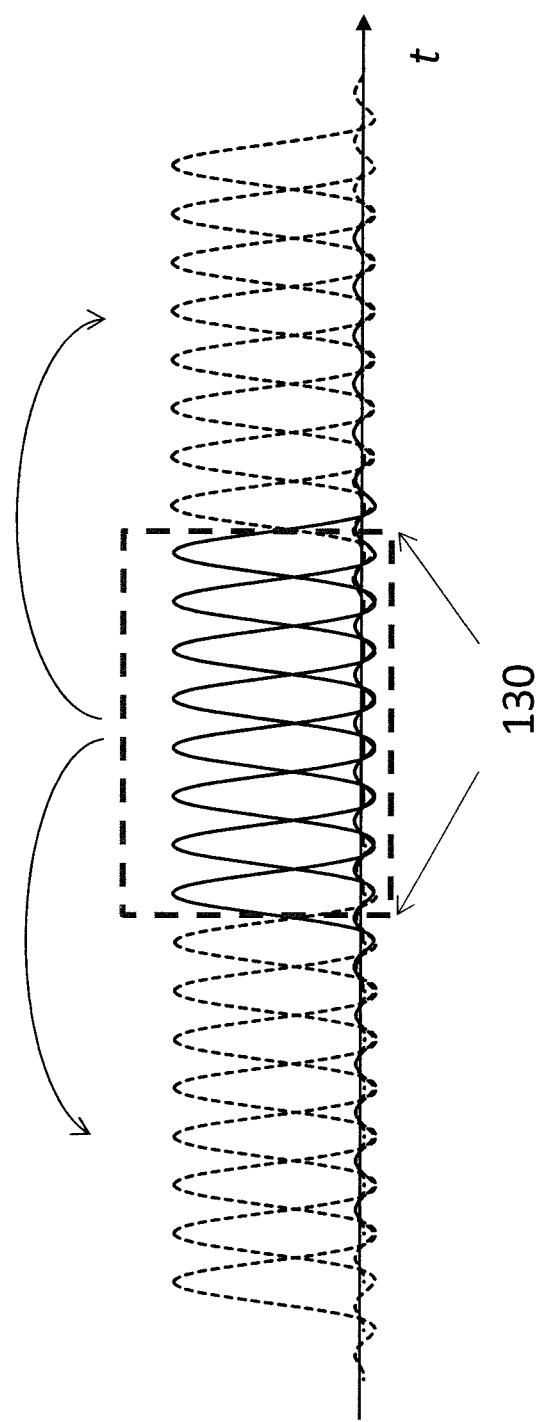
FIG. 13 is a diagram illustrating an example transmission signal in accordance with one implementation of the present disclosure.

FIG. 13 illustrates an example signal tail biting technique employing circular convolution. Time windows are effectively appended to both ends of a circularly convolved signal and the original signal 130 (illustrated within the dashed-line box) is copied or shifted in time and added to each window. The copies of the signal are illustrated in dashed lines. The convolution creates an effectively periodic signal. In this embodiment, a single period of the circularly convoluted signal can be transmitted, and the additional signal information in the tail may be retained rather than being lost due to truncation. For a multi-carrier pulse, the circular convolution may be performed on each subcarrier.

If the removal of time domain tails is performed as described above, guard bands between signal transmissions are not required. In some embodiments, a small separation may be provided and signals may be separated, for example, by a few kilohertz.

In some embodiments, the action of removing a time domain tail of the signal prior to transmission may also be carried out for a signal which has been encoded using a sparsely encoded data sequence, such as an SCMA codeword. The encoding module 122 of the transmitter 120 in this embodiment is configured to map the binary data of the FEC encoded bit stream directly to an SCMA codeword and subcarrier, or subcarriers, as described above, to create a sparse modulated data sequence $S_n$ or $S_{n,m}$.

Figure 14:
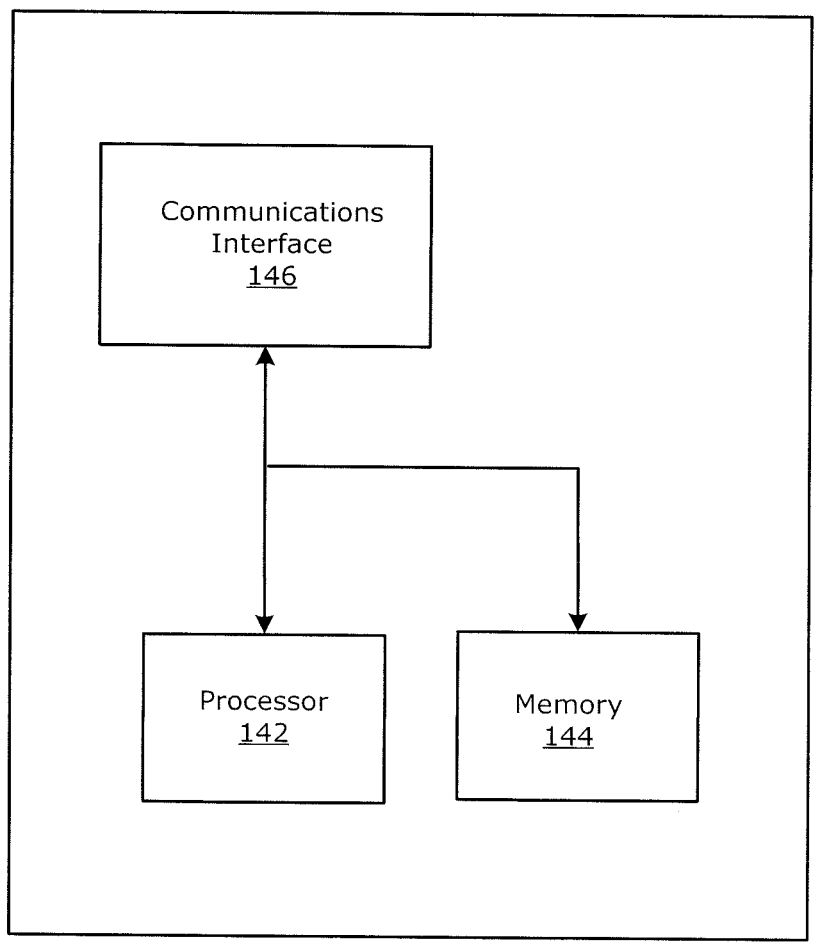
FIG. 14 is a block diagram illustrating a device in accordance with one implementation of the present disclosure.

FIG. 14 shows one embodiment of an electronic device 140 for implementing the methods and components described above. The device 140 may operate according to one or more communications or data standards or technologies including but not limited to fifth generation (5G) or fourth generation (4G) telecommunications networks, 3rd Generation Partnership Project (3GPP) Long-Term Evolution (LTE), Universal Mobile Telecommunications System (UMTS) and other wireless or mobile communications networks. The electronic device 140 may be generally any device capable of providing wireless communications such as a user equipment (UE), wireless transmit/receive unit (WTRU), mobile station (MS), mobile terminal, smartphone, cellular telephone, or other wireless enabled computing or mobile device. The electronic device 140 alternatively may comprise a base station (BS), evolved Node B (eNB), or other network interface or network node which functions as a wireless transmission point, or a wireless transmission and reception point for user devices in a network.

The device 140 may include a processor 142, a memory 144, and a communications interface 146 for sending and/or receiving data over a communications network, which components may or may not be arranged as shown in FIG. 14. The device 140 may include a user interface (not shown) for receiving information and commands from a user of the device and providing or displaying information to user. In some embodiments, the device 140 comprises a machine which performs other primary functions and has the capability to send data to a communications network.

Through the communications interface 146, the device 140 may transmit, receive, or transmit and receive signals through a wireless medium to and from another device in a communications network. The communications interface 146 may include one or more antennas (not shown), transmitters, receivers and decoders (not shown) such as the transmitter illustrated in FIG. 3, FIG. 6, or in FIG. 12. Received signals are input to the communications interface 146 which may perform such common receiver functions as signal amplification, frequency down conversion, filtering, channel selection, analog-to-digital (A/D) conversion, decoding etc. In a similar manner, signals to be transmitted are processed by the communications interface 146, including modulation and encoding, digital-to-analog (D/A) conversion, frequency up conversion, filtering, amplification, and transmission. It will be appreciated that the functions of the communications interface 146 may be carried out by different transceiver or modem components including separate transmitter and receiver components (not shown). It also will be appreciated that the elements of the transmitter as shown in FIG. 3, 6, or 12 may be incorporated within the communications interface 146.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present invention.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for transmitting data comprising:
   encoding binary data to a sparse modulated data sequence, the sparse modulated data sequence exhibiting a sparsity over a plurality of frequency subcarriers of a transmission resource block, such that only one of the plurality of frequency subcarriers is a non-zero subcarrier that carries the binary data, the one non-zero subcarrier being selected from the plurality of frequency subcarriers based on the binary data;
   performing pulse shaping on the sparse modulated data sequence to create a spectrally localized signal having a bandwidth less than a bandwidth of the transmission resource block; and
   transmitting the spectrally localized signal over the plurality of frequency subcarriers.

2. The method of claim 1 wherein the sparse modulated data sequence is a codeword selected from a sparse code multiple access (SCMA) codebook.

3. The method of claim 1 further comprising, prior to transmitting the spectrally localized signal, removing a time domain tail of the spectrally localized signal.

4. The method of claim 3 wherein the time domain tail is removed by applying a circular convolution tail biting technique to the spectrally localized signal.

5. The method of claim 1 wherein the pulse shaping comprises frequency division multiplexing (FDM).

6. The method of claim 1 wherein the pulse shaping comprises filter bank multi-carrier (FBMC).

7. The method of claim 1 further comprising, transforming the sparse modulated data sequence prior to performing the pulse shaping.

8. The method of claim 7 wherein transforming the sparse modulated data sequence comprises applying a quadrature amplitude modulation (QAM), $\pi/4$ QAM, or offset QAM (OQAM) function.

9. The method of claim 1, wherein the bandwidth of the spectrally localized signal is less than half of the bandwidth of the transmission resource block.

10. A method for transmitting data comprising:
    encoding binary data to an encoded low peak-to-average power ratio (PAPR) data sequence using a low PAPR codebook, the data sequence having only one non-zero component for each codeword of the codebook;
    performing pulse shaping on the encoded low PAPR data sequence to create a spectrally localized signal having a bandwidth less than a bandwidth of a transmission resource block;
    removing a time domain tail of the spectrally localized signal to create a modified spectrally localized signal; and
    transmitting the modified spectrally localized signal over a plurality of frequency subcarriers of the transmission resource block.

11. The method of claim 10 wherein removing the time domain tail of the spectrally localized signal comprises applying a circular convolution tail biting technique to the spectrally localized signal.

12. The method of claim 11 wherein performing pulse shaping comprises performing multi-carrier pulse shaping, and wherein the circular convolution tail biting technique is applied for each frequency subcarrier.

13. The method of claim 10 wherein the encoded low PAPR data sequence is a sparse data sequence.

14. The method of claim 10 wherein the pulse shaping comprises frequency division multiplexing (FDM).

15. The method of claim 10 wherein the pulse shaping comprises filter bank multi-carrier (FBMC).

16. The method of claim 10 further comprising, transforming the sparse modulated data sequence prior to performing the pulse shaping.

17. The method of claim 16 wherein transforming the sparse modulated data sequence comprises applying a quadrature amplitude modulation (QAM), π/4 QAM, or offset QAM (OQAM) function.

18. The method of claim 10, wherein the bandwidth of the spectrally localized signal is less than half of the bandwidth of the transmission resource block.

19. A device comprising a communications interface, the communications Interface being configured to:
  encode binary data to a sparse modulated data sequence, the sparse modulated data sequence exhibiting a sparsity over a plurality of frequency subcarriers of a transmission resource block, such that only one of the plurality of frequency subcarriers is a non-zero subcarrier that carries the binary data, the one non-zero subcarrier being selected from the plurality of frequency subcarriers based on the binary data;
  perform pulse shaping on the sparse modulated data sequence to create a spectrally localized signal having a bandwidth less than a bandwidth of the transmission resource block; and
  transmit the spectrally localized signal over the plurality of frequency subcarriers.

20. The device of claim 19 wherein the sparse modulated data sequence is a codeword selected from a sparse code multiple access (SCMA) codebook.

21. The device of claim 19 wherein the communications interface Is further configured to transform the sparse modulated data sequence by applying a quadrature amplitude modulation (QAM), π/4 QAM, or offset QAM (OQAM) function.

22. A device comprising a communications interface, the communications interface being configured to:
  encode binary data to a low peak-to-average power (PAPR) data sequence using a low PAPR codebook, the data sequence having only one non-zero component for each codeword of the codebook;
  perform pulse shaping on the encoded low PAPR data sequence to create a spectrally localized signal having a bandwidth less than a bandwidth of a transmission resource block;
  remove a time domain tail of the spectrally localized signal to create a modified spectrally localized signal; and
  transmit the modified spectrally localized signal over a plurality of frequency subcarrlers of the transmission resource block.

23. The device of claim 22 wherein the communications interface is further configured to remove the time domain tail of the spectrally localized signal by applying a circular convolution tail biting technique to the spectrally localized signal.

24. The device of claim 22 wherein the communications interface is further configured to transform the low PAPR data sequence by applying a quadrature amplitude modulation (QAM), π/4 QAM, or offset QAM (OQAM) function.

* * * * *